June 10, 1958 J. M. SMITH ET AL 2,838,039
PRE-START AND AUXILIARY PRESSURE OILER
Filed June 8, 1954
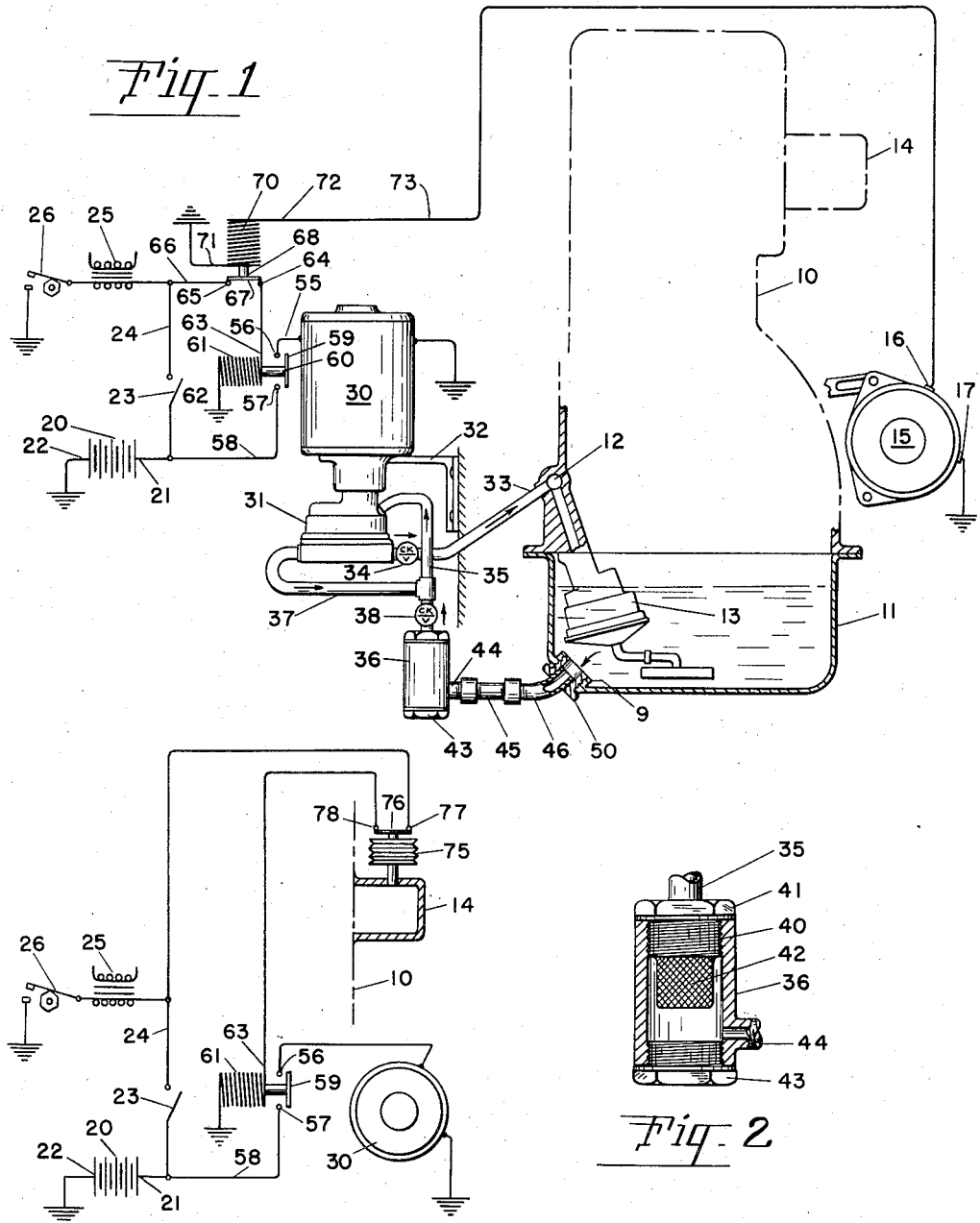
INVENTORS.
JOHN M. SMITH
JOSEPH A. GAY
BY Cook and Ackermerhorn
Attorney

United States Patent Office 2,838,039
Patented June 10, 1958

2,838,039

PRE-START AND AUXILIARY PRESSURE OILER

John M. Smith and Joseph A. Gay, Portland, Oreg.

Application June 8, 1954, Serial No. 435,240

2 Claims. (Cl. 123—196)

This invention relates to a device for establishing pressure in the pressure lubricating system of an engine or other mechanism just prior to, and during, the starting of the engine or mechanism, or when the engine or mechanism is operating at idling speeds.

It is recognized that bearing surfaces, cylinder walls, pistons, piston rings, and the like, are subject to excessive wear when an engine or mechanism containing such parts is being started, before the conventional lubrication system begins to function normally to deliver an adequate supply of lubricant to the rubbing surfaces. An internal combustion engine, for example, is ordinarily equipped with an engine driven oil pump which delivers lubricating oil under pressure to a main oil feed gallery or pipe which in turn distributes the oil supply to all the principal parts of the engine requiring a substantial amount of lubricant. When such an engine is shut down, the relatively thin hot oil drains rapidly from some of the lubricated surfaces, leaving an inadequate film to protect the surfaces when the engine is restarted sometime later. If the re-start is made under relatively cold conditions, the oil in the reservoir and pump may be congealed to some extent and require a longer than normal time to travel through the various oil lines and restricted passages to the most distant parts that require lubrication. Thus, the engine may make many revolutions with some of the wearing surfaces in a substantially dry state before the conventional engine pressure oiling system becomes fully operative to reestablish the necessary oil film on all the wearing surfaces.

There is also a condition in large engines where the conventional oiling system may be inadequate to maintain the lubrication requirements of all parts of the engine at very low speeds. For example, if a large truck or tractor engine is caused to idle for a considerable period of time and the bearings are rather badly worn, there may be excessive oil loss from some of the bearings, causing a pressure drop in the oiling system which will prevent delivery of an adequate supply of oil to certain parts of the engine to provide satisfactory lubrication.

The general object of the present invention is to provide an auxiliary oil pressure device for engines and other mechanisms which will insure an adequate supply of lubricant to all the moving parts under conditions when the conventional oiling system is inoperative or inadequate to supply the needs of the engine or mechanism.

Other objects are to provide an auxiliary motor driven oil pump to lubricate an engine or mechanism prior to the starting thereof, to provide an auxiliary motor driven oil pump for an internal combustion engine which is turned on by the ignition switch of the engine, to provide a system of the type described which will assist the conventional engine oil pump when the engine is idling, and to provide a system of the type described which will automatically shut itself off, either when the engine starts or when the engine is operating above idling speed.

The present device comprises a motor driven pump mounted adjacent the mechanism to be lubricated and connected with its oil reservoir and pressure system. The auxiliary oiling system is preferably put into operation automatically by the manipulation of some means necessary to start the mechanism, such as the ignition switch of an engine. In a matter of a few seconds, the oil pressure gauge will indicate normal operating pressure in the oil lines, at which time the starter may be engaged and energized to start the engine. Thus, prior to the very first movement of the mechanism, the wearing surfaces are supplied with an adequate film of lubricant to eliminate entirely any unnecessary wear before the engine oil pump becomes effective. The auxiliary system may be shut off by any convenient means responsive to an operating speed of the engine which will maintain adequate oil pressure by operation of the engine oil pump alone, such means being adjusted to deenergize the auxiliary pump motor either at idling speed or above idling speed of the engine, as may be desired. The shutoff means which is responsive to engine operation may comprise a governor device responsive to engine speed, a voltage relay responsive to generator speed, or a vacuum operated switch responsive to intake manifold vacuum.

These and other objects and advantages will become apparent and the invention will be better understood as the description proceeds in the following specification with reference to certain preferred embodiments illustrated on the accompanying drawings. It is to be understood, however, that various changes may be made in the contruction and arrangement of parts to accommodate the present system to different types of engines and mechanisms, and that certain features may be used without others within the scope of the invention as defined by the appended claims.

In the drawings:

Figure 1 illustrates a preferred embodiment of the present system applied to an internal combustion engine;

Figures 2 is an enlarged view, in section, of the strainer chamber shown in Figure 1; and Figure 3 illustrates diagrammatically a modification employing a different means to discontinue the operation of the auxiliary oil pump.

The numeral 10 designates a conventional internal combustion engine having an oil reservoir pan 11 to contain the usual supply of lubricating oil for the engine. The pan 11 has a drain opening 9. Above the oil pan in a wall of the engine crank case there is a main oil feed gallery 12 which is normally supplied with oil from the reservoir pan 11 by the engine oil pump 13 when the engine is operating. The gallery 12 communicates with the cam shaft bearings and crank shaft bearings and, in most engines, through passages in the crank shaft to the connecting rod bearings, and thence through passages in the connecting rods to the wrist pins in the pistons to lubricate the wrist pins and also the cylinder walls. In an overhead valve type of engine the oil feed gallery 12 also communicates with a rocker shaft on top of the engine. When the engine is not running, the pump 13 does not operate and the oil tends to drain from the gallery 12 and communicating passages.

The numeral 14 designates the intake manifold of the engine. Such engines are also ordinarily equipped with a generator 15 having a line terminal 16 and a ground terminal 17. The generator is driven by a fan belt or other instrumentality whereby its rotational speed is always proportional to the engine speed. Another item of conventional equipment is the battery 20 which has a line terminal 21 and a ground terminal 22. Connected with battery terminal 21 is an ignition switch 23 in a wire 24 leading to an ignition coil 25. Coil 25 is connected to ground through the breaker switch 26 in the electrical distributor (not shown). The parts thus far described are conventional on a spark ignition type of internal combustion engine and the parts not specifically illustrated are well understood by persons skilled in the art.

In the practice of the invention, a motor and pump unit 30 and 31 are mounted on a bracket 32 attached to a motor support post or other available point of connection, preferably adjacent the oil feed gallery 12 of the engine. The pump 31 has a discharge pipe 33 connected with the oil feed gallery 12. A check valve 34 prevents back flow and loss of pressure from the engine oil pump 13 when the pump 31 is not operating. Oil is supplied to the auxiliary pump 31 by a suction line 35 connected with a strainer chamber 36. To protect the auxiliary pump 31 and its motor against possible overload in the event of obstruction in the oil lines, the pump may be equipped with the customary by-pass line 37 to limit the maximum pressure which may be developed. A check valve 38 is connected in suction line 35 between strainer chamber 36 and by-pass line 37.

The filter chamber 36 is internally threaded at 40 to receive an apertured plug 41 connected with the suction line 35, as shown in Figure 2. The plug 41 carries an oil screen 42 which projects down inside the chamber 36. The lower end of chamber 36 is threaded to receive a drain plug 43. The lower portion of chamber 36 is also equipped with a short nipple 44 for connection with a pipe or tube 45 communicating with the oil pan 11 at some point which is always submerged beneath the surface of the oil supply in the pan. The pipe or tube 45 may conveniently be connected with a 45° L 46 which is tapped into a drilled plug 50 in the drain opening 9. When the present device is installed on an engine in this manner the crank case is drained by removing the plug 43 instead of the conventional drain plug in the opening 9.

The motor 30 is energized by a wire 55 connected with a stationary relay contact 56. A second relay contact 57 is connected with a wire 58 leading to the terminal 21 of battery 20. The motor circuit is energized by a contact bar 59 on a solenoid plunger 60 in a relay coil 61. Relay coil 61 has a terminal 62 connected with ground and a terminal 63 connected with a contact 64 in another relay having a second contact 65. Contact 65 is connected with a wire 66 leading to ignition wire 24. The relay contacts 64, 65 are normally bridged by a contact bar 67 on a solenoid plunger 68 movable within a relay solenoid coil 70. One terminal 71 of the relay coil 70 is connected to ground and the other terminal 72 is connected to a wire 73 leading to the voltage terminal 16 of the generator 15.

The contact bars 59 and 67 of the two relays are normally spring urged to the positions shown when their solenoid coils are not energized. Energization of the solenoid coils pulls the contact bars toward the respective coils.

Thus, in Figure 1, when ignition switch 23 is closed preparatory to starting the engine 10, the relay 61 is energized through wire 66 and contact bar 67, causing contact bar 59 to engage the contacts 56, 57. Auxiliary pump motor 30 is thereby energized through wire 55, contact bar 59 and wire 58 to drive the pump 31 and establish normal operating oil pressure in the main oil feed gallery 12 of the engine before the engine is started.

After the engine has started, a predetermined value of voltage output of generator 15 will develop sufficient attractive force in the solenoid winding 70 to attract the armature plunger 68 and withdraw contact bar 67 from the relay contacts 64 and 65. This action opens the circuit to relay winding 61, causing the contact bar 59 to disengage contacts 56 and 57 and open the circuit of auxiliary pump motor 30.

Relay 70 is a conventional voltage relay which may readily be adjusted by convenient means (not shown) to retract the contact bar 67 at any predetermined voltage developed by the generator. When it is desired to stop the auxiliary pump 31 as soon as the engine 10 has started, the relay 70 may be adjusted to lift its contact bar 67 as soon as a generator voltage corresponding to idling speed of the engine has been attained. The generator voltage at idling speed is ordinarily somewhat lower than the voltage produced throughout the range of operating speeds above idling speed. Therefore, if it is desired to have the auxiliary oil pump 31 supplement the engine oil pump delivery at idling speeds, it is a simple matter to adjust the relay 70 to respond to a higher voltage so that the contact bar 67 will not be actuated out of engagement with contacts 64 and 65 until some predetermined speed above idling speed has been attained. With such an adjustment, the relay 70 will drop its contact bar to energize the relay 61 and start the auxiliary pump 31 whenever the engine slows down to idling speed, thereby insuring adequate pressure lubrication of the engine at all times.

Figure 3 illustrates a modification in which the auxiliary pump is shut off in response to a vacuum condition in the intake manifold of the engine resulting from the starting of the engine. The auxiliary pump motor 30 is controlled by ignition switch 23 and relay 61 as in Figure 1, but a manifold vacuum responsive switch has been substituted for the generator voltage responsive relay to de-energize the auxiliary pump motor. A flexible pressure responsive bellows 75 is connected with the intake manifold 14 and equipped at its free end with a contact bar 76 which normally engages a pair of stationary contacts 77, 78 at atmospheric pressure. Contact 77 is connected with the ignition wire 24 and contact 78 is connected with terminal 63 of the relay solenoid coil 61. After the engine has started, the normal reduction in pressure in manifold 14 contracts the bellows 75, drawing contact bar away from contacts 77, 78 to open the circuit of relay coil 61 and deenergize auxiliary pump motor 30. Whenever the engine stops, the resumption of atmospheric pressure in manifold 14 re-expands the bellows 75 to again press contact bar 76 into engagement with the contacts 77, 78.

For convenience of illustration, the relay 61 is shown connected to the ignition circuit, but it will be appreciated by persons skilled in the art that relay 61 may be energized in an independent circuit wherein the starting switch for the auxiliary pump is operated coincidentally with the ignition switch for the engine. It will also be appreciated that the principles of the invention may be applied to other machinery having a similar starting lubrication problem. In the case of a diesel type engine, the starting switch for the auxiliary pump is arranged to be closed coincidentally with some function necessary to the starting of the engine, such as the opening of the fuel valve or the closing of the starter circuit.

In all such applications the objects of the invention are accomplished by causing the auxiliary pump to establish oil pressure in the pressure system of the mechanism prior to the initial operation of the mechanism so that the moving parts will not start to function without adequate lubrication.

Having now described our invention and in what manner the same may be used, what we claim as new and desire to protect by Letters Patent is:

1. In an internal combustion engine having a lubricating oil pressure passage and a crank case oil reservoir under the engine equipped with a drain opening, an auxiliary pump to establish normal operating pressure in said pressure passage when the engine is not operating, a supporting bracket for mounting said pump adjacent the engine, a discharge pipe from said pump connected with said pressure passage in the engine, a strainer chamber outside of said crank case having a drain plug, a pipe connecting said strainer chamber with said drain opening in said oil reservoir, and a suction pipe for said auxiliary pump connected with said strainer chamber.

2. In an internal combustion engine having a lubricating oil pressure passage and a crank case oil reservoir under the engine equipped with a drain opening, an auxiliary pump to establish normal operating pressure in said pressure passage when the engine is not operating, a supporting bracket for mounting said pump adjacent the engine, a discharge pipe from said pump connected with said pressure passage in the engine, a check valve in said discharge pipe to prevent back flow through said pipe from said pressure passage when said auxiliary pump is not operating, a strainer chamber outside of said crank case having a drain plug, a pipe connecting said strainer chamber with said drain opening in said oil reservoir, a suction pipe for said auxiliary pump connected with said strainer chamber, a second discharge pipe from said pump connected with said suction pipe, and a check valve in said suction pipe between said strainer chamber and said second discharge pipe connection to prevent back flow through said strainer chamber.

References Cited in the file of this patent

UNITED STATES PATENTS

| | | |
|---|---|---|
| 804,284 | Waterhouse | Nov. 14, 1905 |
| 2,102,514 | Clarkson | Dec. 14, 1937 |
| 2,110,662 | Fisher | Mar. 8, 1938 |
| 2,273,888 | Paulsen | Feb. 24, 1942 |

FOREIGN PATENTS

| | | |
|---|---|---|
| 1,079,392 | France | May 19, 1954 |